United States Patent [19]

Ty

[11] 4,276,754
[45] Jul. 7, 1981

[54] REFRIGERATOR CONTROL AND SYSTEM

[75] Inventor: Henry Ty, Attleboro, Mass.

[73] Assignee: Texas Instruments Incorporated, Dallas, Tex.

[21] Appl. No.: 78,427

[22] Filed: Sep. 24, 1979

[51] Int. Cl.³ .................... F25D 17/04; G05D 23/02
[52] U.S. Cl. ..................................... 62/187; 62/408; 236/101 D
[58] Field of Search ................ 62/187, 408; 236/49, 236/101 D; 98/40 VT

[56] References Cited

U.S. PATENT DOCUMENTS

| | | | |
|---|---|---|---|
| 2,337,484 | 12/1943 | McCollum | 236/101 D |
| 3,378,199 | 4/1968 | Snell | 236/49 |
| 3,893,307 | 7/1975 | Jacobs | 62/187 X |

*Primary Examiner*—William E. Wayner
*Attorney, Agent, or Firm*—James P. McAndrews; John A. Haug; Melvin Sharp

[57] ABSTRACT

A low cost control regulates air flow between the freezer and food compartments of a side-by-side refrigerator and cooperates with a freezer thermostat to form a system which regulates operation of the refrigerator compressor in an energy efficient manner. A spiral coil spring of thermostat metal material has its inner end secured to a damper shaft to bias damper movement between positions opening and closing a control housing orifice in response to changes in temperature. A cylinder fitted around and secured to the outer end of the spring coil rotates to adjust the spring bias for selectively changing the temperature setting of the control. A control arm has a split sleeve at one end releasably clamped to the cylinder at a selected angle for initially calibrating the control and system, the opposite arm end being slidable on the control housing to rotate the arm for selectively varying the spring bias. The spring is responsive to selected changes in food compartment temperature to open the orifice and let cool freezer air into the food compartment when required and then to close the orifice for minimizing the frequency and duration of compressor operations initiated by the freezer thermostat.

7 Claims, 4 Drawing Figures

REFRIGERATOR CONTROL AND SYSTEM

BACKGROUND OF THE INVENTION

A conventional side-by-side refrigerator typically has a manually adjustable orifice in the wall between its side-by-side food and freezer compartments. A thermostat then regulates operation of the refrigerator compressor and fan in response to change in food compartment temperature. Compressor operation rapidly cools the freezer compartment and the fan moves cool freezer air through the orifice into the food compartment until, when food compartment temperature is restored, the thermostat terminates further compressor and fan operation. With such a system, the thermostat and the orifice size are adjusted through trial and error by reference to the relative coolness or firmness of items in the food and freezer compartments and the initial settings are usually suitable for individual taste taking into account the ambient temperature and the frequency and duration of door openings by the user during the period when the settings are first made. Frequently however the settings are not then readjusted as the conditions of use gradually change and as a result, in many cases where the orifice is left too small for the new conditions for example, the compressor will operate excessively and will unduly lower freezer temperature before sufficient cool freezer air flows into the food compartment to restore its temperature and to cause the food compartment thermostat to terminate the compressor operation.

It had been proposed that thermally responsive means be used for regulating air flow from the freezer into the food compartment and that a thermostat then regulate compressor and fan operation in response to changes in freezer compartment temperature. Such a system would provide better control of the temperatures in the food and freezer compartments under changing conditions and would permit more energy efficient refrigerator operation. However thermally responsive control means having the desired operating temperatures ranges, calibration capability, selective adjustability by the user, ruggedness, long service life, and compactness for use in such an application have typically incorporated bellows or other relatively complex structures so that such thermally responsive means have tended to be too expensive for widespread adoption and use in side-by-side home refrigerators and the like.

It is an object of this invention to provide a novel and improved refrigerator control system; to provide such a system which is particularly adapted for use in regulating operation of a refrigerator having side-by-side food and freezer compartments; to provide such a system which is economically practiced to install and which is reliable, economical and energy efficient in use; to provide a thermally responsive control which is particularly adapted for use in such a refrigerator system; and to provide a compact and rugged air flow control which is adapted to be conveniently accommodated and operated in a home refrigerator or the like.

SUMMARY OF THE INVENTION

Briefly described, the novel and improved refrigerator control system of this invention includes a conventional adjustable thermostat arranged to regulate operating cycles of a refrigerator compressor and fan in response to changes in freezer compartment temperature. That is, the thermostat is preferably located in the freezer compartment so that it actuates the compressor and fan for cooling the freezer compartment whenever freezer temperature rises above a first level and so that it then terminates compressor and fan operation when freezer temperature is restored to a second lower level. The system also includes a novel, low cost thermally responsive bimetallic air flow control which regulates air flow through an orifice from the freezer into the food compartment in response to changes in food compartment temperature, thereby to restore food compartment temperature whenever required and to thereafter close the orifice for minimizing the frequency and duration of the periods of compressor operation. The novel control has a low cost integral structure which is characterized by compactness, ruggedness, good range of adjustment, ease of adjustment, reliability and ease of calibration making it practical for installation and use in side-by-side home refrigerators and the like.

More specifically, the novel control includes a housing which is easily accommodated in an opening in a wall dividing the refrigerator food and freezer compartments for defining an orifice of selected size between the compartments. The housing mounts a damper on a shaft for rotation between positions progressively opening and closing the orifice. A thermally responsive bimetallic helical coil spring has its inner end secured to one end of the shaft for progressively moving the damper between its open and closed positions in response to changes in food compartment temperature. Preferably for example, the housing comprises a box open at one end and having an orifice in one side of the box. The open end of the box is fitted into the opening in the refrigerator compartment wall so that cool freezer air enters the box and so that the other end of the box extends into the refrigerator food compartment to permit the cool air to flow through the orifice into the food compartment. The damper shaft is mounted at said other box end for pivoting the damper between positions opening and closing the orifice. The damper is inside the box to operate without risk of obstruction but one end of the shaft extends from the housing into the refrigerator food compartment and the helicial coil spring is secured to that shaft end at that location to be responsive to changes in food compartment temperatures.

In the novel control, a cylinder is preferably fitted over and secured to the outer end of the thermally responsive coil spring. A control arm has a split sleeve at one end which is fitted over and releasably clamped to the cylinder. The opposite end of the arm is slotted and engaged with a slide which is movable along the length of the control housing. In that arrangement, movement of the slide rotates the control arm to rotate the coil spring on the damper shaft, thereby to apply a selected bias to the spring so that it closes the damper when the food compartment temperature is below a selected temperature level but opens the damper whenever the food compartment temperature rises above that level. The releasable clamping of the split sleeve on the spring cylinder is easily adjusted for calibrating the control so that slide movement provides the desired range of temperature adjustment in the refrigerator food compartment.

In the refrigerator system of this invention, cool freezer air is permitted to enter the food compartment promptly to restore a desired food compartment temperature whenever required. As soon as the food compartment temperature is restored, the novel control closes its orifice for avoiding further transfer of freezer air such as would unduly lower food compartment temperature or unduly raise freezer temperature. When freezer temperature does increase above a selected temperature level as set by the adjustable freezer thermostat, the refrigerator compressor and fan are actuated for restoring the desired freezer temperature. Accordingly, food and freezer compartment temperatures are properly regulated and the refrigerator compressor is operated in an economical and energy efficient manner. The thermally responsive control which regulates air flow between the freezer and food compartments is easily calibrated to provide a desired range of temperature level adjustment in the food compartment. The integral control unit is also easily accommodated in the refrigerator wall dividing the refrigerator compartments so that the control is easily adjusted from within the food compartment, so that the bimetallic spring is properly responsive to temperature changes within the food compartment, and so that the control permits rapid flow of cool freezer air into the food compartment whenever required. The control is also compact, rugged, reliable and inexpensive so that it is fully practical for use in home refrigerator applications.

DESCRIPTION OF THE DRAWINGS

Other objects, advantages and details of the novel and improved refrigerator control and system as provided by this invention appear in the following detailed description of preferred embodiment of the invention, the detailed description referring to the drawings in which.

Figure 1:
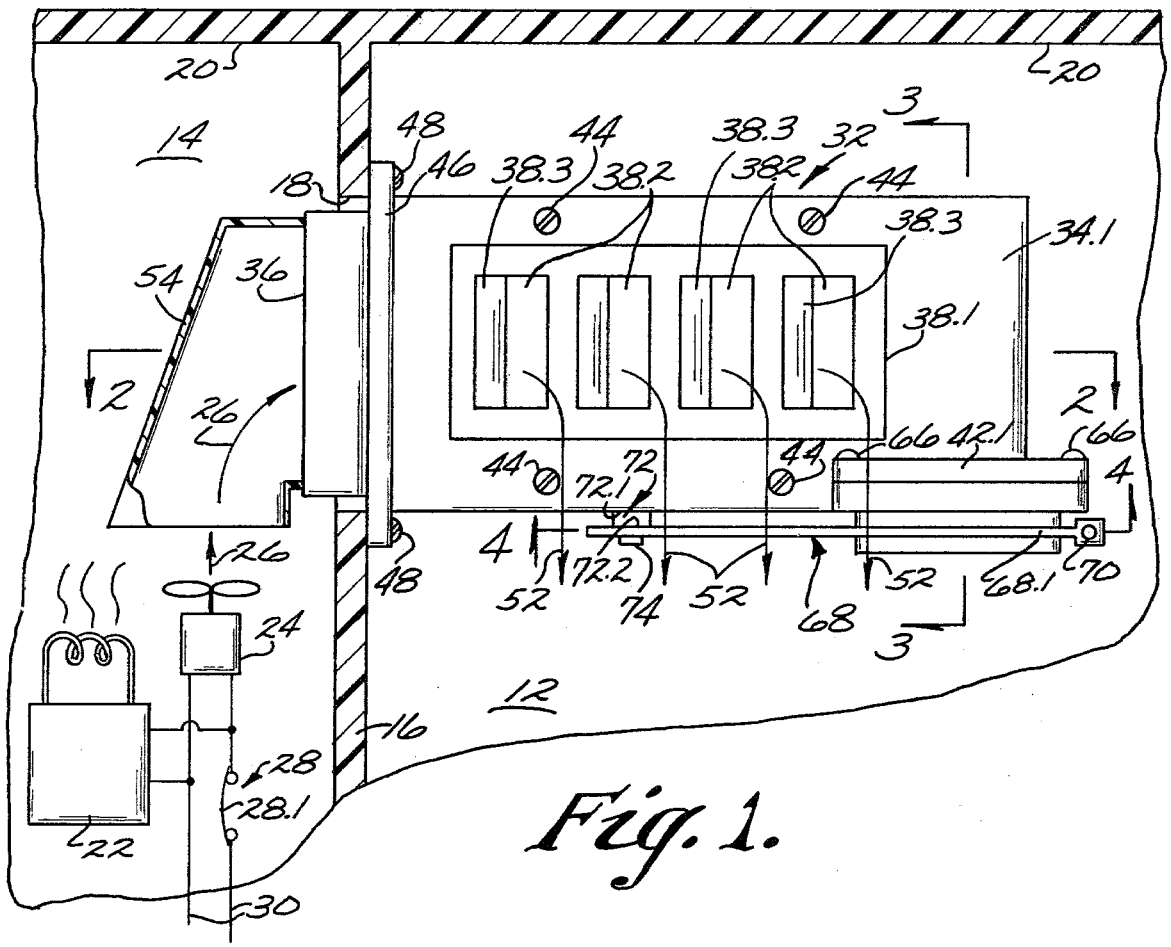
FIG. 1 is a diagrammatic view illustrating operation of the refrigerator control and system of this invention.
Figure 2:
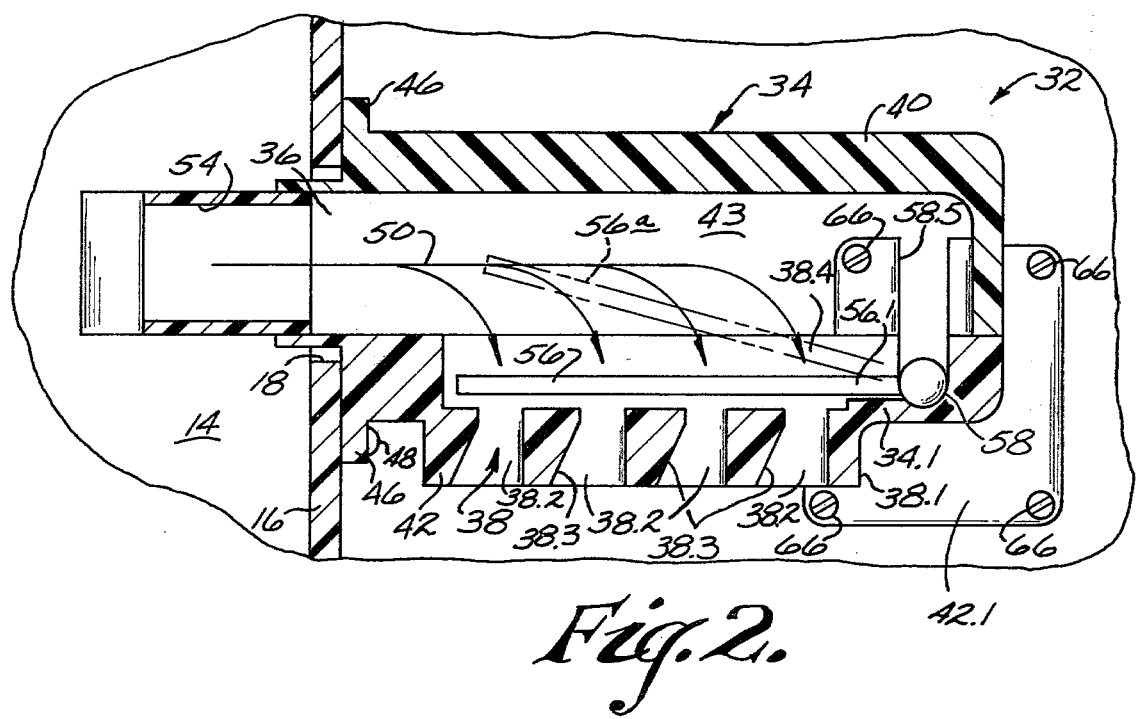
FIG. 2 is a section view along line 2—2 of FIG. 1.
Figure 4:
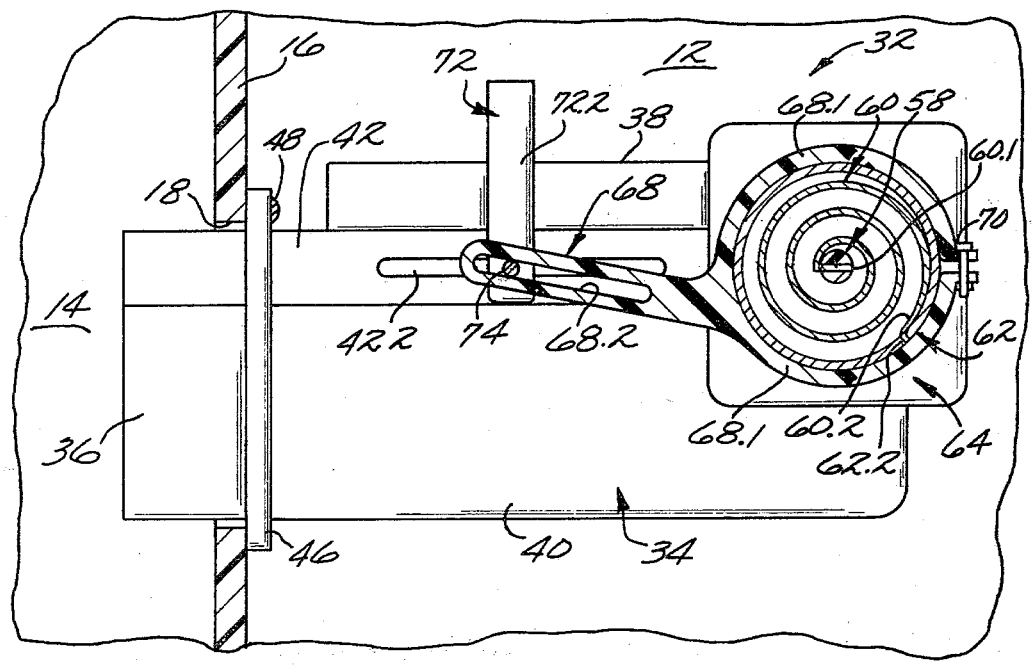
FIG. 4 is a section view along line 4—4 of FIG. 1.

Referring to the drawings, 10 in FIGS. 1, 2 and 4 diagrammatically illustrates the compartment structure of a conventional side-by-side home refrigerator or the like which is shown to include a main or food compartment 12 located alongside a freezer compartment 14. As will be understood, those compartments have respective doors (not shown) which are located in side-by-side relation to each other at the front of the refrigerator. A dividing wall 16 located between the compartments has an opening 18 usually near the top walls 20 of the compartments, for providing a path of the passage of cool air from the freezer into the food compartment. A refrigerator compressor is operable to cool the freezer compartment in any conventional manner as is diagrammatically illustrated at 22 in FIG. 1 and a fan 24, arranged to operate whenever the compressor is operating, typically circulates air within the freezer compartment 14 and directs a flow of cool freezer air into the wall opening 18 as shown by the arrows 26 in FIG. 1. An adjustable thermostat 28 is arranged in the freezer for example to be responsive to changes in freezer compartment temperature for regulating the frequency and duration of the periods of compressor and fan operation to maintain the freezer temperature within a desired range. Typically, for example, the compressor and fan are electrically operable and are connected in parallel to a power line 30 through the thermostat 28 so that the compressor and fan are actuated by closing of the thermostat circuit for cooling the freezer whenever freezer temperature falls below a first selected level and so that operation of the compressor and fan is terminated by opening of the thermostat circuit when freezer temperature is restored to a second relatively lower level. The thermostat 28 is of any conventional type within the scope of this invention and accordingly is not further described herein. However, it will be understood that the thermostat includes a snap acting bimetallic disc 28.1 or other conventional means responsive to changes in temperature in the freezer compartment for opening and closing a circuit and is adapted to be adjusted in any conventional way for setting said first and second compressor actuating temperatures at desired levels for maintaining freezer temperatures within a desired range.

In accordance with this invention, the refrigerator system as above described further includes a thermally-responsive bimetallic air flow control 32 which is mounted in the opening 18 in the compartment dividing wall for regulating the flow of cool air from the freezer 14 into the food compartment 12 in response to changes in food compartment temperature. The control preferably comprises a housing box 34 which is open at one end 36 as shown in FIG. 2 and which has an orifice 38 located in one side of the box. Preferably the housing is formed in two parts having one channel-shaped part 40 of a shape-retaining foamed polystyrene material or the like which has good thermal insulating properties and having a cover part 42 of rigid, high impact polystyrene material or the like which is secured to the channel part by screws 44 of in other conventional manner to form the chamber 43 within the housing. Preferably the cover 42 has the orifice 38 molded therein in the form of a recessed louver 38.1 having several open sections 38.2 separated by sloped grid sections 38.3 and having a shelf 38.4 extending into the louver molding. The open end 36 of the housing box is easily accommodated in the wall opening 18 as shown in FIGS. 1, 2 and 4 and flange portions 46 on the housing are secured to refrigerator wall 16 by screws 48 or in other conventional manner so that the housing extends into the food compartment 12 as shown. In that arrangement the open housing end 36 receives cool freezer air as indicated by the arrows 26 and directs that cool air through chamber 43 into the foood compartment 12 as indicated by the arros 50 in FIG. 2 and by the arrows 52 in FIG. 1. If desired, a baffle or air scoop 54 is press fitted or otherwise mounted in the open housing end as shown in FIGS. 1 and 2 to facilitate entry of air into the control 32.

Figure 3:
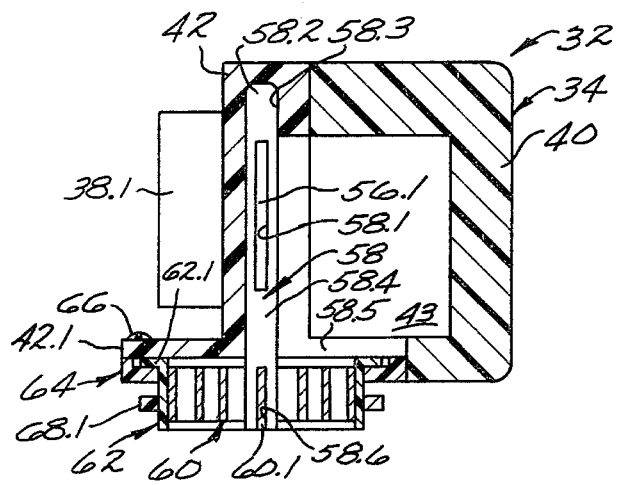
FIG. 3 is a section view along line 3—3 of FIG. 1.

In accordance with this invention, a damper blade 56 is mounted on a shaft 58 for rotation within the housing 34 between the position shown in solid lines in FIG. 2 where the blades extends along the side 34.1 of the housing for substantially closing the orifice 38 and the position indicated in broken lines 56a where the damper permits air to flow through the orifice. In the preferred embodiment of this invention, one end 56.1 of the damper blade is press-fitted in a slit 58.1, or is molded into or otherwise secured on a first portion of the shaft located adjacent the orifice 38. One end 58.2 of the shaft is journaled in the base 58.3 in the rigid housing cover 42 while the additional opposite extending end portion 58.4 of the shaft extends through a slot 58.5 in the cover as shown in FIGS. 2 and 3. In that arrangement, the damper blade is easily mounted in the control 32. That is, the shaft 58 is moved into the slot 58.5 while held by the blade 56 and the shaft end 58.2 is fitted into the base 53, the blade then being pivoted over the shelf 38.4 into the molded louver 38.1. Attachment of the housing part 40 to the rigid cover part 42 retains the damper blade in that assembled position for pivotal movement between its orifice opening and closing positions. The extending lower end 58.4 of the shaft extends outside the housing chamber 43 as is shown particularly in FIG. 3.

In accordance with this invention, a thermally responsive bimetallic spiral coil spring 60 is engaged with the damper shaft 58 for biasing the damper between its orifice opening and closing positions in response to changes in coil temperature. For clarity of illustration, only one layer of the bimetallic spring material is shown in FIGS. 3 and 4 but it will be understood that the bimetal spring is of any conventional type embodying multiple layers of metal of different coefficients of thermal expansion and that the spring is adapted to coil and uncoil to selected extents in response to selected temperature changes in conventional manner. In a preferred embodiment of the invention, the inner end 60.1 of the coil spring is secured in a slit 58.6 in the additional lower end of the damper shaft. An open-ended cylinder 62 preferably having a flange 62.1 at one end is fitted over the coil spring and the outer end 60.2 of the spring is secured in the slot 62.2 in the cylinder as shown in FIG. 4. A cover flange or boss 42.1 is molded or otherwise provided on the housing cover and a flanged ring 64 is secured to the boss over the cylinder flange 62.1 by screws 66 or the like for positioning the cylinder on the cover while permitting cylinder rotation relative to the cover. A control arm 68 has split sleeve portions 68.1 at one end of the arm fitted around the cylinder 62 and screw means 70 secures the split sleeve portions together for releasably clamping the cylinder. The opposite end of the control arm is slotted as at 68.2. A slide member 72 has a pin 74 therein which extends from one side 72.1 of the member and is keyed to slide in a slot 42.2 formed in the housing cover and which extends from the opposite side 72.2 of the member and is keyed to slide in the control arm slot 68.2. In that arrangement, selective manual movement of the slide member 72 by the user of the refrigerator control rotates the control arm 68 and the clamped cylinder 62 for varying the bias applied to the damper shaft 58 by the thermally responsive spring 60, thereby to adjust the temperature levels at which the spring will position the damper blade in its orifice opening and closing positions in the control. Loosening of the screw 70 permits the releasable clamping of the cylinder 62 by the arm 68 to be adjusted to change the calibration of the control, thereby to permit a different range of temperature adjustment to result from movement of the slide member 72.

In the refrigerator system of this invention, the air flow control 32 cooperates in a convenient and reliable manner with the freezer thermostat 28 for reliably maintaining food and freezer compartment temperatures within desired ranges. The user conveniently sets the adjustable thermostat 28 to provide whatever degree of firmness is desired in the freezer storage items without imposing any undesired temperature level limitations on the food compartment temperature. The air flow control 32 is then adjsuted by the user by movement of the slide 72 to achieve the desired coolness for the items stored in the food compartment. The settings are easily adjusted by trial and error reference to food firmness and coolness etc. to suit individual tastes under any ambient temperature conditions or other conditions of use and the desired temperature levels are maintained even though such conditions of use may change to a very great extent. Under each set of conditions, the air flow control permits cool freezer air to flow promptly into the food compartment whenever necessity to restore food compartment temperature but loss of cool freezer air into the food compartment is otherwise prevented for minimizing the frequency and duration of the operations of the refrigerator compressor which are necessary to maintain freezer temperature. In that way the system achieves most efficient energy usage.

The air flow control 32 is also of compact, rugged, reliable and low cost construction permitting it to be practical for use in home refrigerator applications and the like. The integral control unit 32 is easily fitted into openings 18 provided by the refrigerator box manufacturers after the split sleeves 68.1 have been conveniently adjusted for calibrating the controls to suit the requirements of the particular refrigerator applications. The control housing accommodates all wear and stress functions in one housing part formed of high impact polystyrene material or the like while the remainder of the housing is formed of low cost, easily formed, light weight, thermal insulating material or the like. The relay assembly is simple and inexpensive but provides a device which is compact and in which the damper is free to move without risk of obstruction. The thermally responsive coil spring is conveniently located where it is rapidly responsive to changes in food compartment temperature but the spring is easily and inexpensively formed and assembled in the control to permit a wide range of adjustment in temperature settings effected by the thermally responsive spring.

It should be understood that although preferred embodiments of this invention have been described by way of illustrating the invention, the invention includes all modifications and equivalents of the disclosed embodiments falling within the scope of the appended claims.

I claim:

1. An integral thermally responsive air flow control mountable as a unit in a refrigerator for regulating air flow from a first refrigerator compartment through a refrigerator wall into a second compartment in response to changes in temperature in the second compartment comprising an elongated housing having an opening at one end, having a closed opposite end and having an orifice of selected size in a side of the housing, means for mounting the control on a refrigerator with a portion of the housing extending through a refrigerator wall in substantially sealed relation to the wall to dispose the open housing end in the first compartment and to dispose the orifice and the closed housing end in the second compartment, a shaft rotatably mounted on the housing at the closed housing end, the shaft having a first portion inside the housing adjacent the orifice and having an additional portion extending from the housing, an elongated damper blade mounted inside the housing on the first shaft portion to extend longitudinally toward the open housing end to be movable wholly within the housing between a first position extending along said housing side for substantially closing the orifice and a second position opening the orifice to permit air flow from the open housing end through the orifice, a thermally responsive thermostat metal helical coil spring having inner end operatively secured to said additional shaft portion to mount the spring outside the housing to be movable in response to temperature changes in the second refrigerator compartment for moving the damper blade in response to such changes, the coil spring also having an outer end, and adjust means movably mounted on the housing and secured to the outer end of the coil spring for selectively moving the spring to a selected extend so that the spring is adapted to progressively move the damper blade between its orifice opening and closing positions in response to changes in the coil temperature within a selected temperature range, whereby the control is mountable as a unit so that the open housing end is adapted to receive air from a first refrigerator compartment and so that the closed housing end is adapted to extend into a second compartment to permit the orifice to open into the second compartment and to dispose the thermally responsive spring to be responsive to temperature changes in the second compartment.

2. An integral thermally responsive air flow control for regulating air flow from a first refrigerator compartment into a second compartment in response to changes in temperature in the second compartment comprising a housing having an open end and a closed end and having an orifice of selected size in a side of the housing, a shaft rotatably mounted on the housing at the closed housing end having a first portion adjacent the orifice and having an additional portion, a damper blade mounted on the first shaft portion for movement inside the housing between a first position extending along said housing side for substantially closing the orifice and a second position opening the orifice, a thermally-responsive thermostat metal helical coil spring having an inner end secured to said additional shaft portion and having an outer end, adjust means movably mounted on the housing and secured to the outer end of the coil spring for selectively moving the spring to a selected extent so that the spring is adapted to progressively move the damper blade between its orifice opening and closing positions in response to changes in the coil temperature within a selected temperature range, and means for mounting the housing so that the open housing end is adapted to receive air from a first refrigerator compartment and so that the closed housing end is adapted to extend into a second compartment to permit the orifice to open into the second compartment and to dispose the thermally responsive spring to be responsive to temperature changes in the second compartment, said adjusting means comprising a cylinder fitted over the coil spring and secured to the outer end thereof so that the cylinder is rotatable for coiling and uncoiling the spring, and control arm means movably mounted on the housing and secured to the cylinder for movement to rotate the cylinder to a selected extent for selecting the temperature range in which the thermally responsive spring moves the damper blade between its orifice opening and closing portions said control arm means including an arm having split sleeve means at one end of the arm clamped to the cylinder and having slot means at the opposite end of the arm, and slide means slidable on the housing, the slide means being slidably engaged in the slot means on the arm for selectively rotating the arm and cylinder in response to selected movement of the slide means on the housing, the split sleeve means being releasably clamped to the cylinder for permitting calibrating of the control.

3. An integral thermally responsive air flow control for regulating air flow from a first refrigerator compartment into a second compartment in response to changes in temperature in the second compartment comprising a housing having an open end and a closed end and having orifice of selected size in a side of the housing, a shaft rotatably mounted on the housing at the closed housing end having a first portion adjacent the orifice and having an additional portion, a damper blade mounted on the first shaft portion for movement inside the housing between a first position extending along said housing side for substantially closing the orifice and a second position opening the orifice, a thermally responsive thermostat metal helical coil spring having an inner end secured to said additional shaft portion and having an outer end, adjust means movably mounted on the housing and secured to the outer end of the coil spring for selectively moving the spring to a selected extent so that the spring is adapted to progressively move the damper blade between its orifice opening and closing positions in response to changes in the coil temperature within a selected temperature range, and means for mounting the housing so that the open housing end is adapted to receive air from a first refrigerator compartment and so that the closed housing end is adapted to extend into a second compartment to permit the orifice to open into the second compartment and to dispose the thermally responsive spring to be responsive to temperature changes in the second compartment, the housing comprising a relatively low cost first part formed of a shape-retaining foamed material of relatively high thermal insulating properties, and a second part formed of a relatively stronger, rigid material secured to the first part for defining a housing chamber therebetween, the damper blade shaft being mounted on the rigid cover part to be securely supported for permitting pivotal movement of the damper blade inside the chamber between its orifice opening and closing positions.

4. An air flow control as set forth in claim 3 wherein the rigid cover part has a louver portion recessed at the inner side of the housing defining the housing orifice and has a bore and slot opening into respective opposite sides of the recessed louver, the shaft has one end fitted into the bore and an opposite end extending from the slot mounting the damper blade on the cover part for pivotal movement into and out of the recessed louver between the orifice opening and closing positions of the blade, and the first housing part is secured to the cover part for retaining the shaft in the bore and slot.

5. An air flow control as set forth in claim 4 having said housing mounting means embodied in the rigid cover part for permitting reliable and secure mounting of the control.

6. An integral thermally responsive air flow control for regulating air flow from a first refrigerator compartment into a second compartment in response to changes in temperature in the second compartment comprising:
a first channel-shaped housing part of shape-retaining foamed material having relatively high thermal insulating properties,
a housing cover of relatively more rigid material secured to the first housing part to form a housing chamber therebetween having an open-end and a closed end, the cover part having a louver therein defining an orifice in one side of the housing, the louver being recessed at the inner side of the housing chamber and having a bore and a slot opening into opposite sides of the recess at the closed housing end,
a damper blade,
a shaft having one end rotatable in the cover bore and having an opposite end extending from the cover slot outside the housing, the shaft being secured to an end of the damper blade for moving the blade into and out of the recessed cover louver within the housing between a first position extending along the one housing side substantially closing the orifice and a second position opening the orifice, a thermally responsive thermostat metal spiral coil spring having an inner end secured to the shaft outside the housing and having an outer end, a cylinder fitted over the coil spring and secured to the outer end of the coil spring for coiling the spring to a selected extent so that the spring is adapted to move the damper blade between its orifice opening and closing positions in response to changes in coil temperature within a selected temperature range, a control arm having split sleeve means at one end releasably clamped to the cylinder for rotating the cylinder, having slot means at an opposite end of the arm, and having slide means slidably movable in the housing and engaged in the slot means in the arm for selectively rotating the cylinder in response to selected movement of the slide means for selecting said temperature range, the split sleeve means being releasable from the cylinder for permitting calibration of the control, and means on the housing for mounting the housing with the open housing end adapted to receive air from one refrigerator compartment and with the closed housing end extending into a second compartment to permit the orifice to open into the second compartment and to dispose the thermally responsive spring to be responsive to temperature changes in the second compartment.

7. A control system for a refrigerator having a food compartment and freezer compartment and means for cooling one of the compartments comprising thermostat means for regulating the operation of the cooling means for maintaining the temperature in said one compartment within a selected temperature range, and a thermally responsive air flow control for regulating air flow from said one refrigerator compartment into the other refrigerator compartment in response to changes in temperature in the other compartment, characterized in that the thermally responsive air flow control comprises an integral unit with an elongated housing having an opening at one end, having a closed opposite end and having an elongated orifice of selected size extending along a side of the housing, means for mounting the control on the refrigerator with a portion of the housing extending through a wall of the refrigerator between said compartments in substantially sealed relation to the wall to dispose the open housing end in said freezer compartment and to dispose the orifice and the closed housing end in the food compartment, a shaft rotatably mounted on the housing at the closed housing end, the shaft having a first portion inside the housing adjacent the orifice and having an additional portion extending from the housing, an elongated damper blade mounted inside the housing on the first shaft portion to extend longitudinally toward the open housing end to be movable wholly within the housing between a first position extending along said housing side for substantially closing the orifice and a second position opening the orifice to permit air flow from the open housing end through the orifice, a thermally responsive thermostat metal helical coil spring having an inner end operatively secured to said additional shaft portion to mount the spring outside the housing to be movable in response to temperature changes in the food compartment for moving the damper blade in response to such changes, the coil spring also having an outer end, and adjusting means movably mounted on the housing and secured to the outer end of the coil spring for selectively moving the spring to a selected extent so that the spring is adapted to progressively move the damper blade between its orifice opening and closing positions in response to changes in the coil temperature within a selected temperature range, whereby the open housing end receives air from refrigerator freezer compartment and extends into the food compartment to permit the orifice to open into the other compartment and to dispose the thermally responsive spring to be responsive to temperature changes in the other compartment.

* * * * *